Feb. 27, 1962  T. GALEANO  3,022,856
SAFETY DEVICE
Filed April 24, 1961
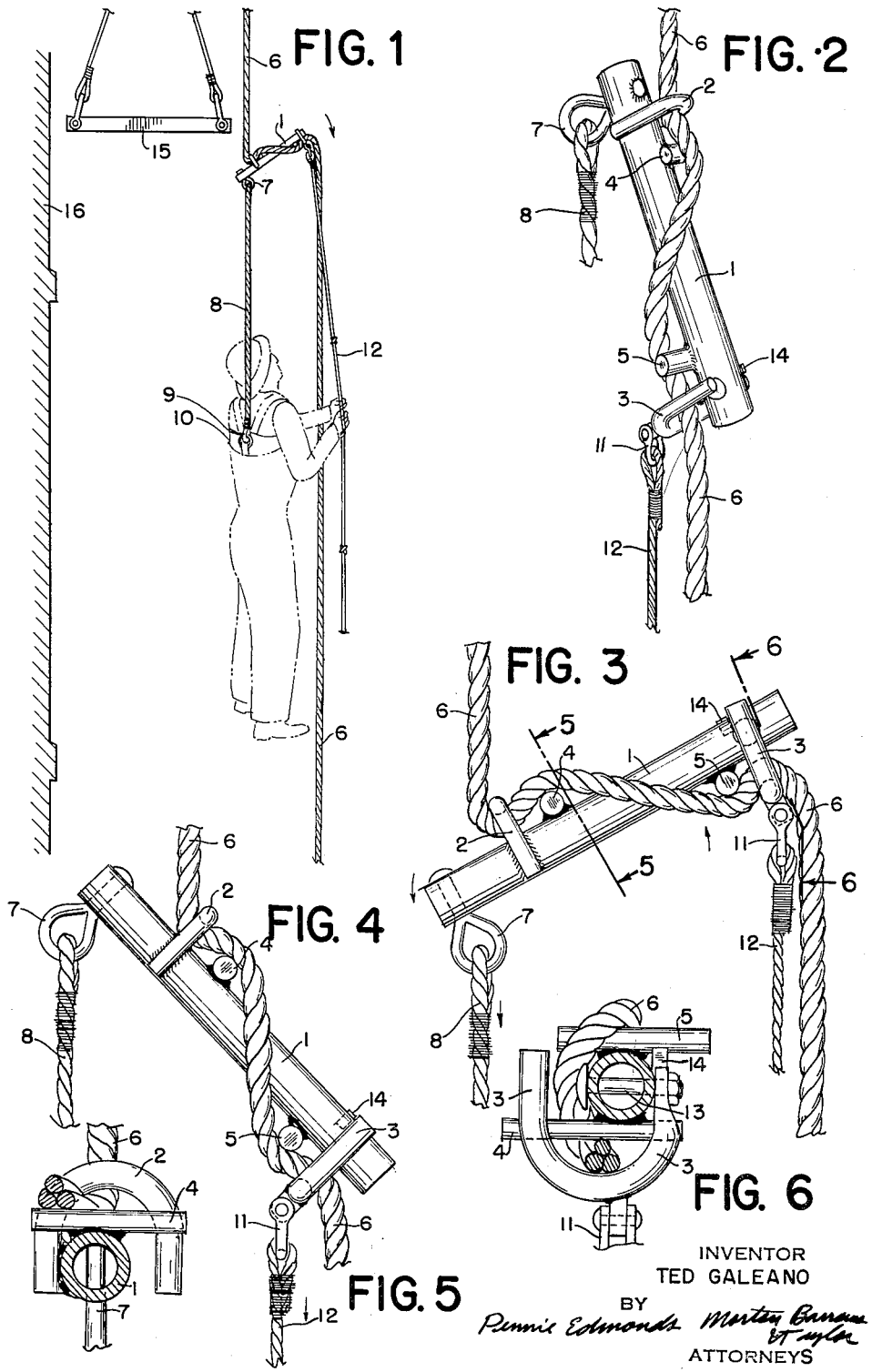
INVENTOR
TED GALEANO
BY Pennie Edmonds Morton Barrows & Taylor
ATTORNEYS

United States Patent Office 3,022,856
Patented Feb. 27, 1962

3,022,856
SAFETY DEVICE
Ted Galeano, 83 Dikeman St., Brooklyn, N.Y.
Filed Apr. 24, 1961, Ser. No. 104,942
2 Claims. (Cl. 182—193)

This invention relates to safety devices for riggers who work on platforms on the sides of buildings.

Sometimes those working on the platform, on the side of a building, are injured or hit or lose their balance and fall off the platform and, to take care of such cases, a safety device is highly important.

Safety ropes are commonly provided, running from the roof or from a support on the side of the building below the roof and above the platform, and extending down past the platform to the ground or to a lower level.

The present invention provides a safety device which can readily be attached to such safety ropes, by which a workman or rigger falling off the platform will be supported and held and prevented from falling, and which also permits a workman or rigger so held to lower himself on the safety rope by manipulation of the safety device.

It is one advantage of the safety device of the present invention that it can readily be attached to and detached from the safety rope and, when attached to the safety rope, will hold a workman against falling or downward motion while permitting downward motion on the safety line by the workman, by proper manipulation of the safety device.

The invention will be further described in connection with the accompanying drawings, illustrating one embodiment thereof, but it will be understood that the invention is illustrated by but is not limited thereto.

In the accompanying drawings,

FIG. 1 shows the safety device in use with a workman or rigger supported thereon;

FIG. 2 shows the safety device in a different position with reference to the safety rope to permit sliding of the safety device downwardly over the safety rope;

FIG. 3 is an enlarged view of the safety device shown on a smaller scale in FIG. 1;

FIG. 4 shows the safety device in position to permit a man to slide down on the safety rope;

FIG. 5 is a sectional view taken on the line 5—5 of FIG. 3; and

FIG. 6 is a sectional view taken on the line 6—6 of FIG. 3.

The safety device illustrated has a bar 1, shown as a pipe, with a U-shaped hook 2, secured to and arranged on the upper side of the bar near one end and with another U-shaped hook 3 secured to and on the under side of the bar 1 near its other end. A cross-bar 4 is connected to the bar 1 on the upper side near the hook 2; and a cross-bar 5 is connected to the lower side of the bar 1 near the hook 3.

The safety rope 6 is shown as passing through the hook 2 over the cross-bar 4 around the bar 1 to the under side and then over the cross-bar 5 and through the hook 3. The provision of the hooks and cross-bars enables the safety device to be applied to the rope by means of the hooks. The safety device can thus be attached to the safety rope at any desired location merely by passing the safety rope under the hooks and over the cross-bars.

At one end of the bar 1, adjacent the U-shaped hook 2, is a ring support 7, to which is connected one end of a rope 8, the other end of which has a hook 9 for attaching it to a belt or harness 10 worn by the rigger or workman. The arrangement is such that, if a workman falls off the scaffold, the resulting pull on the rope 8 will lower the end of the bar to which the ring 7 is attached and correspondingly raise the opposite end of the bar 1 to a position such that the frictional resistance to the movement of the safety rope 6 will prevent the sliding of the rope through the safety device, so that the workman is held suspended by the rope 8.

At the other end of the bar 1 is a ring 11, to which an operating rope 12 is attached. The hook 3 is pivoted at 13 and the ring 11 is attached to the bottom of the hook on the side near the hook support from the bar. The hook 3 can move to a limited extent over the pivot into a position such as shown in FIGS. 1 and 3, where the rope 6 is held clamped between the hook 3 and the cross-bar 5. The movement of the hook 3 in the opposite direction to the position shown in FIG. 4 is a limited movement controlled by the stop 14.

A platform 15 is shown conventionally in FIG. 1, but its location is not that which would correspond to that of a workman working on the platform. Normally, with a workman on the platform, the safety device would be located at a higher level than the workman, so that the supporting rope 8 would extend downwardly from the safety device and be attached to the workman, while permitting free movement of the workman on the scaffold. The scaffold is shown in FIG. 1 in a raised position or one where the workman has already passed down to a position below the scaffold.

It will be seen that the supporting rope 8 is attached to a ring at one end of the bar 1, which is only a short distance from the hook 2, and that the hook 2 is the main supporting element around which the safety rope 6 first passes. The ring 11 at the other end of the bar 1 is many times as far from the supporting hook 2 as the ring 7. Normally, the only weight applied to the remote end of the bar 1 is the rope 12 and the downwardly extending portion of the safety rope 6.

When a workman or rigger falls off the scaffold and is held by the supporting rope 8 in the position shown in FIG. 1, the weight of the workman will lower that end of the bar 1 and correspondingly raise the other end of the bar to a position that prevents sliding of the safety device downwardly over the rope. The frictional resistance of the safety rope 6 in passing at a rather sharp angle around the hook 2, then over the bar 4, around the bar to the underside and over the bar 5, and then through the hook 3 at a rather sharp angle, is such that the frictional resistance holds the workman from falling. If he is injured and unable to move, the safety device will hold him until rescued.

When, however, the workman desires to lower himself, he pulls downwardly on the rope 12 sufficiently to lower that end of the rope to a position where the frictional resistance to the movement of the safety rope 6 through the safety device will permit such movement. If the leverage represented by the distance between the U-shaped hook 2 and the ring 11 is three times the distance between the ring 7 and the hook 11, then a workman only has to apply a pull of around one-third his own weight to lower the remote end of the safety device and permit sliding of this device downwardly over the safety rope. By permitting the rope 12 to rise or by releasing hold of this rope, the remote end of the bar will again rise and the end to which the workman is attached will lower to a point where further movement will be stopped.

Accordingly, the workman or rigger supported by the safety device has merely to pull down the rope 12 sufficiently to permit downward movement of the safety device at a regulated rate and raise this rope to stop downward movement.

If the safety rope extends to the ground, the workman can lower himself gradually with the safety device sliding over the safety rope until the ground is reached. In higher buildings, an intermediate scaffold or support may be located above the ground, to which a workman can lower himself in a similar way.

The utilization of hooks of the kind illustrated enables the safety device to be detached from the safety rope, e.g., when the workman has reached the ground. There is no occaison for threading the safety rope through these hooks, since they can readily be attached to the rope and removed from it. And when the safety device has been used to lower the workman, it can be taken up to a location near the paltform again and readily attached to the safety rope and to another workman working on the platform.

I claim:

1. A safety device for supporting a workman, such as a rigger falling off a platform, comprising a bar having a U-shaped hook on the upper side at one end and a U-shaped hook on the under side of the bar near the other end, a cross-bar on the upper side of said bar near the first hook, and a cross-bar on the under side of the bar near the second hook, whereby a safety rope can be passed through said hooks and over said bars, means for supporting a safety rope for a workman at the end of the bar near the upwardly extending hook, and means for attaching an operating rope at the other end of the bar near the downwardly extending hook.

2. A safety device for supporting a workman and permitting lowering of the workman on a safety rope, including a safety rope extending from a higher support through the safety device to a lower location, the safety device having a bar with an upwardly extending hook near one end in which the safety rope is held, a downwardly extending hook secured to the bar of the safety device at the other end and in which the safety device is held, cross-bars on said safety device adjacent said hooks, over which the safety rope is passed, means for supporting a safety rope for a workman at the end of the safety device adjacent the upwardly extending hook, and means for attaching an operating rope to the safety device at the end near the downwardly extending hook to permit movement of the safety device by pulling downwardly on this rope.

No references cited.